Dec. 25, 1962 C. E. BROOKS ETAL 3,070,666

DISTRIBUTED LINE CONCENTRATOR SYSTEM

Filed July 22, 1960 5 Sheets-Sheet 1

INVENTORS C. E. BROOKS
G. B. CROFUTT, JR
J. L. HENRY

BY SEHollander

ATTORNEY

Dec. 25, 1962 C. E. BROOKS ETAL 3,070,666

DISTRIBUTED LINE CONCENTRATOR SYSTEM

Filed July 22, 1960 5 Sheets-Sheet 2

INVENTORS C. E. BROOKS
G. B. CROFUTT, JR.
J. L. HENRY

BY S E Hollander

ATTORNEY

Dec. 25, 1962 C. E. BROOKS ETAL 3,070,666

DISTRIBUTED LINE CONCENTRATOR SYSTEM

Filed July 22, 1960 5 Sheets-Sheet 3

INVENTORS C. E. BROOKS
G. B. CROFUTT, JR.
J. L. HENRY
BY SEHollander
ATTORNEY

DISTRIBUTED LINE CONCENTRATOR SYSTEM

INVENTORS C. E. BROOKS
G. B. CROFUTT, JR.
J. L. HENRY
BY S. F. Hollander
ATTORNEY

DISTRIBUTED LINE CONCENTRATOR SYSTEM

Filed July 22, 1960 5 Sheets-Sheet 5

INVENTORS C. E. BROOKS
G. B. CROFUTT, JR.
J. L. HENRY
BY SE Hollander
ATTORNEY 3,070,666
DISTRIBUTED LINE CONCENTRATOR SYSTEM Chester E. Brooks, Montvale, George B. Crofutt, Jr., Verona, and James L. Henry, New Providence, N.J., assignors to Bell Telephone Laboratories, Incorporated, New York, N.Y., a corporation of New York
Filed July 22, 1960, Ser. No. 44,761
35 Claims. (Cl. 179—18)

This invention relates to line concentrators and more particularly to distributed line concentrators in which portions of the control and switching facilities are dispersed geographically and disposed in proximate relation to subscriber substations in lieu of centralization of switching and control facilities in a single location.

Recently, widespread interest has been evoked in the development of remote line concentrating facilities for use in the telephone plant. This interest has been generated largely as a result of a number of unique and important benefits derived from remote line concentration.

Remote line concentration may perhaps be best understood when viewed in the historical context which gave rise to its development.

"Concentration" of lines, per se, is at least as old as central offices. Thus, in a typical central office, the switching paths in the office are not provided on a per subscriber termination basis; traffic considerations do not warrant an arrangement of this kind which, moreover, would be of prohibitive cost.

Instead, conventional practice dictates the "concentration" of lines in the central office such that a relatively large number of subscriber lines have access to a smaller number of switching facilities. The "central office concentration" ratio is predicated on the quality of service to be provided under peak load conditions.

With regard specifically to remote line concentration, heretofore this type of arrangement comprehended the grouping of a number of subscriber lines at a remote locale in an arrangement analogous to the central office concentration. The lines are connectable on a shared basis to a lesser number of trunks which extend to a central telephone office. The ultimate goal, of course, is to obviate the necessity of providing a separate and independent channel for each telephone line directly to the central office.

A number of manifest benefits accrue from the concentration of the lines and the reduced number of trunks to the central office, particularly copper and other outside plant costs. However, as is often the case in the wake of each measurable advance in telephone switching technology, a number of new and substantial problems are generated.

Paramount among these problems is the fact that since the result of remote concentration is to deprive the individual substation of a completely independent channel to the central office, the supervision of the substation is rendered more difficult. This follows since the substation is now divorced from the conventional metallic electrical connection to the central office which, in the past, has provided a simple and reliable means (e.g., through a line relay) of discovering the supervisory condition of the substation, i.e., on-hook, dialing, etc.

To meet the problem of supervision of the (electrically divorced) substation by the central office, various devices have been conceived although their common and fundamental purpose is to transcend the dissociation of the substation from its traditional bond to the central office.

These devices, although completely operative and useful for the purposes intended, in certain instances require continuous "dynamic" scanning of the substation line and continuous transmission of information gleaned from the scanning to the central office. In a number of cases, the sophistication and complexity of the scanning arrangements and the attendant costs thereof may measurably affect the savings achieved through line concentration.

Since one of the compelling factors in favor of line concentration at a remote locale is rooted in the economic benefits occasioned, it is apparent that the advantages thus obtained are at least partially neutralized if the concentrating facilities require additional expensive and complex units which are otherwise unnecessary in conventional direct line systems.

Moreover, in a number of scanning arrangements for line concentrators operation is on a time division basis in which each line is assigned a particular time slot and repeatedly examined in the same time slot with information thus obtained transmitted to the central office. The disadvantages of this type of arrangement are manifold and in addition to the intricate equipment required for performing this operation, problems arise in correctly correlating each bit of information transmitted with the corresponding line examined, in turn necessitating various counting and timing arrangements.

In addition, the information obtained through scanning activities is often of considerable volume. Since this information, in certain arrangements, is transmitted to the central office for processing, additional new channels which may be reserved exclusively for control signaling are required. Furthermore, in view of the wealth of signaling information required to be transmitted, the control transmission facilities or trunks may be considerable in number.

Since, as discussed above, the ultimate motivation in line concentration is to reduce the number of direct connections to the central office, an excessive number of control trunks is a manifestly self-defective requirement.

It is therefore an object of this invention to provide a line concentrator in which continuous dynamic scanning is unnecessary.

A further object of this invention is to provide a line concentrator in which the quantity of control information and the trunk conductors reserved for control information are minimal.

In a number of previous remote concentrating arrangements the philosophy of line concentration was quite literally conceived.

Thus, efforts were directed to accomplishing the concentration of lines at a remote locale in a physical line concentrator at which each of the lines to be concentrated was terminated. From the remote line concentrator equipment, a number of trunks, less in number than the number of lines, would extend to the central office. Since the facilities in the remote line concentrator were compelled to have sufficient flexibility to accomplish the scanning, control, transmission and other attributes referred to supra, it was natural that these arrangements would become sophisticated and costly.

In consequence of the burden imposed by the intentional centralizing of all control and terminating facilities in a single physical unit an electrical complex arises which may rival in intricacy and physical size a subsidiary or small central office.

Since, by definition, a remote line concentrator is stationed in the field at some substantial distance from an existing telephone central office, the problems of situating the physical units essential to house the complex control circuitry and the line terminating facilities are of considerable magnitude. In short, pole mounting of the equipment becomes difficult in view of the exaggerated physical size and disposition on the ground is attended by other complicating factors such as the necessity to build shelters, guard fenches, etc. Underground installation is always subject to the sharply increased costs attendant thereon.

It is therefore an object of this invention to provide line concentrator facilities in which the centralized arrangement of control and supervisory equipment are obviated.

A further object of this invention is to provide a distributed remote concentrator in which individual switching and control facilities are dispersed proximate to the substation locations.

Still another object is to provide for minimal physical size of said individual switching and control facilities to facilitate pole mounting.

Perhaps one of the most telling disadvantages which applies in the conventional disposition of centralized remote line concentrator equipment is one which is so obvious that it may heretofore have been granted only passing consideration. It has always been necessary in conjunction with the use of remote line concentrator equipment when centralized at a remote locale to extend each of the subscriber lines to be concentrated to the centralized location where the remote line concentrator is physically disposed. The inexorable rule is that each line, regardless of distance from the concentrator, must be physically extended thereto in order to provide an operative arrangement.

But, in essence, it was the stringency of this very requirement (i.e., the rule that each line must be connected to the control equipment at a central location) that produced the reaction in switching technology in which remote line concentrators found their genesis.

The controlling and ultimate motivation for the use of line concentrators and the reason for the increasing interest in this area, as explained at the outset hereof, was produced by the attempt to avoid the inflexible requirement of connecting each line to the central office independently.

Thus, in overcoming the historical necessity of connecting each line to the central office, the philosophy heretofore employed was rather prosaic. In short, previous attempts were directed to providing a subsidiary or ancillary office, i.e., a remote line concentrator to which each of the lines would be connected and from which a lesser number of trunks would extend to the central office.

Examined in its historical perspective, this type of switching procedure is simply an extension of the concepts which gave rise to the creation of telephone central offices themselves. In fact, when viewed in the context which existed earlier in telephone switching technology (as explained supra), each telephone central office was a "concentrator" which precluded the necessity of extending a separate telephone channel from each subscriber to ever other subscriber.

By the same rationale it is apparent that certain previous practices with regard to remote line concentrators are simply to provide another (remote) "central office" in microcosm.

Thus, by requiring the independent connection of each concentrator line to a centralized remote line concentrator, telephone switching technologists have been rigidly imposing a burden analogous to that which line concentrators are designed to overcome.

It is therefore an object of this invention to provide a line concentrator system for use with existing telephone switching systems in which it is unnecessary to independently connect each line to a centralized remote line concentrator.

Still another object of this invention is to provide a remote line concentrator having switching and control facilities of unique simplicity.

Although concentrator arrangements are carefully designed from the traffic and usage standpoint to insure that a calling subscriber will, except under unusual circumstances, be granted access to the central office for communication purposes, it is natural from the "percentage" use or shared arrangement of the transmission facilities and the preponderantly greater number of substations than transmission channels that occasionally an all-circuits-busy condition be encountered.

Under a number of previous concentrator arrangements this situation gave rise to a condition where the customer was completely divorced from any possibility of voice communication with the central office, at least until a channel became available. In fact, in most prior art arrangements it followed from the complete occupation of all signaling trunks that the subscriber could not even be apprised of the fact that there would be a delay in completing his call. Thus the subscriber on lifting his receiver not only failed to receive "dial tone" but remained attached to a completely "dead" line, i.e., he could not signal or be signaled.

A singular and unique advantage of the instant arrangement includes facilities for surmounting this difficulty by providing a wholly independent auxiliary transmission path available for signaling in either direction when all normal communication channels are unavailable by reason of a busy condition or otherwise.

Thus a subscriber may be informed of the fact that all communication trunks are busy and to call again in a short period of time. This, of course, avoids the awkward situation described above in which the subscriber is, in effect, granted a "dead" connection.

More important, perhaps, from the standpoint of public safety, is the fact that the auxiliary transmission path of the instant invention is available for emergency signaling purposes by a would-be calling subscriber when all usual speech trunks are occupied.

Thus, in the event that a subscriber has immediate need of police or fire rescue assistance, the complete occupation of the usual speech channels to he central office will not debar him from reaching assistance over the direct auxiliary transmission circuit. The subscriber may, by voice communication over the latter path, apprise an attendant at the telephone central office of the nature of the emergency whereupon the attendant can dispatch the required assistance.

Viewed in broad compass, the provision of an auxiliary independent transmission path to each distributed line concentrator customer not only transcends the limitations otherwise imposed by previous line concentrators but in substance elevates the quality of service of these customers to a level superior to that of nonconcentrated lines since the latter, of course, are dependent on a single transmission path to the central office which may be delayed at the central office termination in view of the shared nature of the common control equipment connectable to the subscriber's line.

It is, therefore, an object of this invention to provide an auxiliary transmission path to the central office independent of the usual speech channels.

It is also desirable in a concentrator arrangement to be able on occasion to permit intraconcentrator calls over an auxiliary transmission path which would preclude the necessity of providing separate trunks for the calling and called parties. In addition to the emergency and auxiliary features available through the use of the auxiliary transmission path a greater measure of flexibility would be afforded if subscribers were enabled to converse with each other over the same auxiliary transmission path.

It is therefore an object of this invention to enable conversation among a plurality of subscribers over the same auxiliary transmission path.

Related to this type of "chain" conversation, it would be advantageous in a concentrator arrangement to enable a single authority at the telephone central office to address all of the substations connected to the concentrator simultaneously.

It is therefore an object of this invention to provide for

"broadcast" transmission over an auxiliary transmission path to a plurality of substations simultaneously.

The flexibility of a telephone concentrator system may be further enhanced by permitting connection of a plurality of code receiving units such as "Teletype" receivers concurrently to the auxiliary transmission path. This would broaden the scope of service available to the subscribers by permitting continuous facilities for code transmission over the auxiliary transmission path.

It is therefore an object of this invention to permit "Teletype" transmission to a plurality of "Teletype" receivers over the auxiliary transmission path.

These and other objects of the invention are accomplished in an illustrative embodiment in which a remote line concentrator is provided which presupposes a plurality of separate line package or switching elements unique to individual substation lines and physically disposed at a geographical location proximate to the individual substations. A plurality of coding or number group leads and a number group return lead are extended in the field to each of the lines to be concentrated. In addition, an appropriate number of speech or communication trunks are likewise extended in the field to each of the subscriber lines to be connected.

To provide access by a particular substation to the central office, the line package individual to a substation line includes arrangements for connecting a line to a selected arrangement of number group leads in accordance with a code identifying the line. In addition, each line is directly connected to the number group return lead.

Crosspoints in the package are arranged to connect the tip and ring conductors of the line to corresponding conductors of each of the speech trunks in response to control signals from the central office.

It is immediately apparent from the above that the basic format of this concentrator is a marked departure from certain prior art centralized concentrators discussed above in that the remote concentrator itself is "distributed" in the remote or field portion rather than concentrated in a single location.

This radical change in switching technology overrides the necessity of connecting each telephone subscriber to a central location, thereby overcoming the problem which gave rise to the need for line concentrators and for which previous line concentrators gave only partial ameliorative effect.

Thus by rejecting the conventional dictates which characterized some previous remote line cencentrators, i.e., the provision of a subsidiary or "small central office" type of remote concentrator, the instant invention provides a simple solution to a problem of long standing.

To continue with the operation of the invention, an originating call (substation off-hook) provides current flow on the selected number group leads to which the individual substation is connected and these leads are detected at the central office to determine the identity of the calling substation. As a result of the identification procedure, arrangements are made to connect the calling substation to one of the speech trunks that extends to the central office. The crosspoints between the speech trunks and the substation line are energized by marking signals applied over the same selected number group leads and the selected trunk conductors, to complete the talking connection, and supervision of the call is performed conventionally.

A feature of this invention is a remote line package including switching and control equipment individual to a subscriber substation and located in contiguity to that station.

Another feature of this invention is the geographical distribution of line concentration equipment in a plurality of individual locations contiguous to subscriber substations.

Still another feature of this invention is a plurality of number group leads which are extended from a central office to each of the line packages in the system.

A further feature of this invention includes a plurality of diodes selectively connecting each of said packages to said number group leads in unique coded arrangements.

Another feature of this invention includes arrangements for connecting each of said packages to a selected one of said number group lead through resistance to provide a path for marking current.

A further feature of this invention includes arrangements for providing balanced switching facilities at each of said line packages.

Still another feature of this invention includes transistor crosspoints connectable to the tip and ring conductors of said lines at each of said line packages.

Another feature of this invention includes arrangements at a central office for marking a selected line package by applying potentials to the appropriate number group leads.

A further feature of this invention includes means for energizing one of the two crosspoints in a line package in response to the energization of the other crosspoints.

A further feature of this invention includes a translator for applying marking potentials to the number group leads.

Still another feature of this invention includes an auxiliary transmission path over one of the number group leads for use in emergency or otherwise.

Another feature of this invention includes facilities for interconnecting a plurality of substations for voice transmission over the auxiliary transmission path.

A feature of this invention includes facilities for providing "broadcast" transmission from the central office over the auxiliary transmission path to a plurality of subscribers simultaneously.

A further feature of this invention includes facilities for simultaneously transmitting code messages to a plurality of "Teletype" receivers connected to the auxiliary transmission path.

A further feature of this invention includes a number group detector responsive to signals on said number group conductors originating at said remote packages and at said translator.

These and other objects and features of the invention may be more readily apprehended from an examination of the following specification, appended claims and attached drawing in which:

Figure 1A:
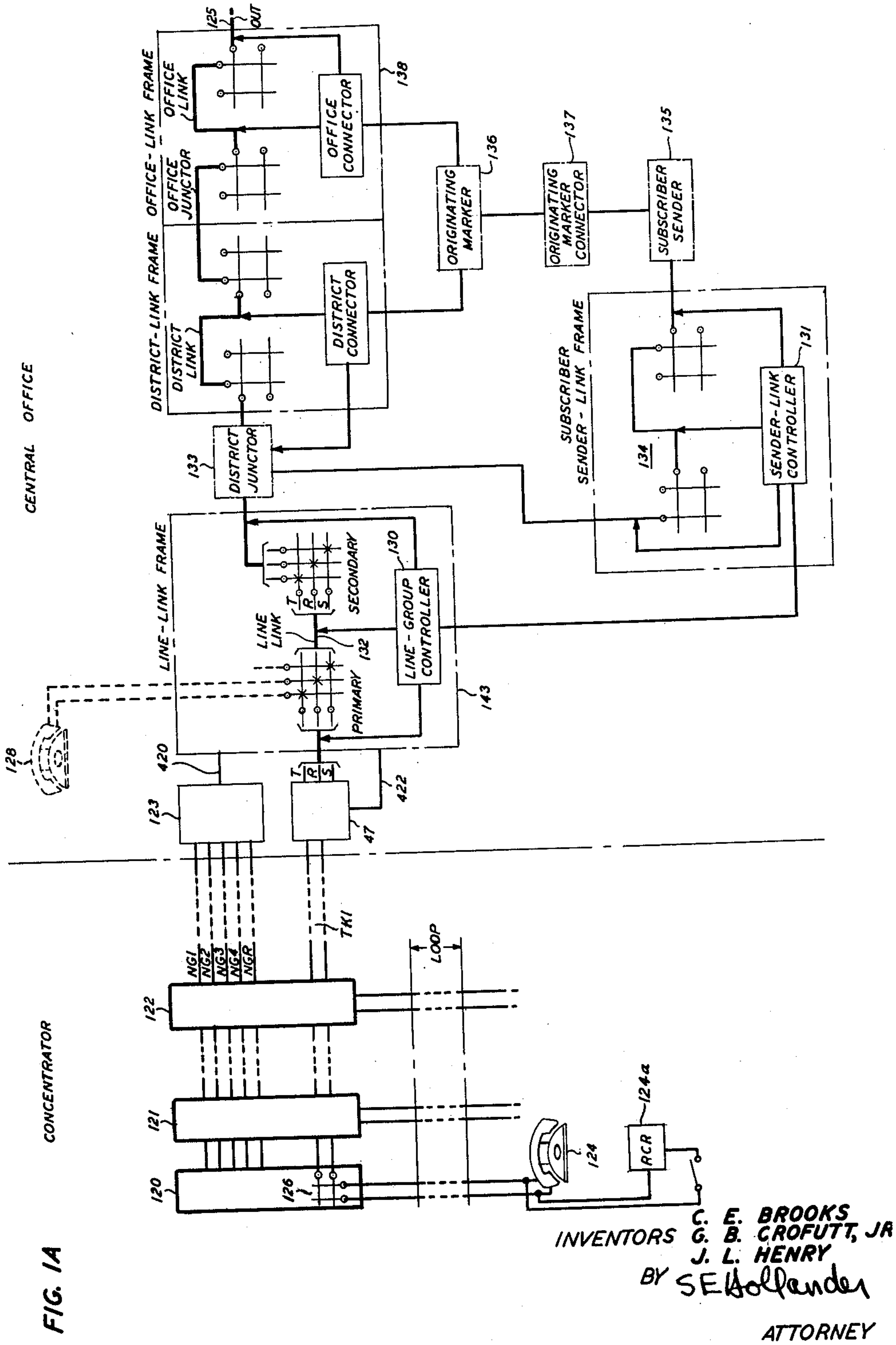
FIG. 1A shows a block diagram of the invention in combination with a conventional No. 1 crossbar telephone office during the processing of a call originating at the remote concentrator.
Figure 1B:
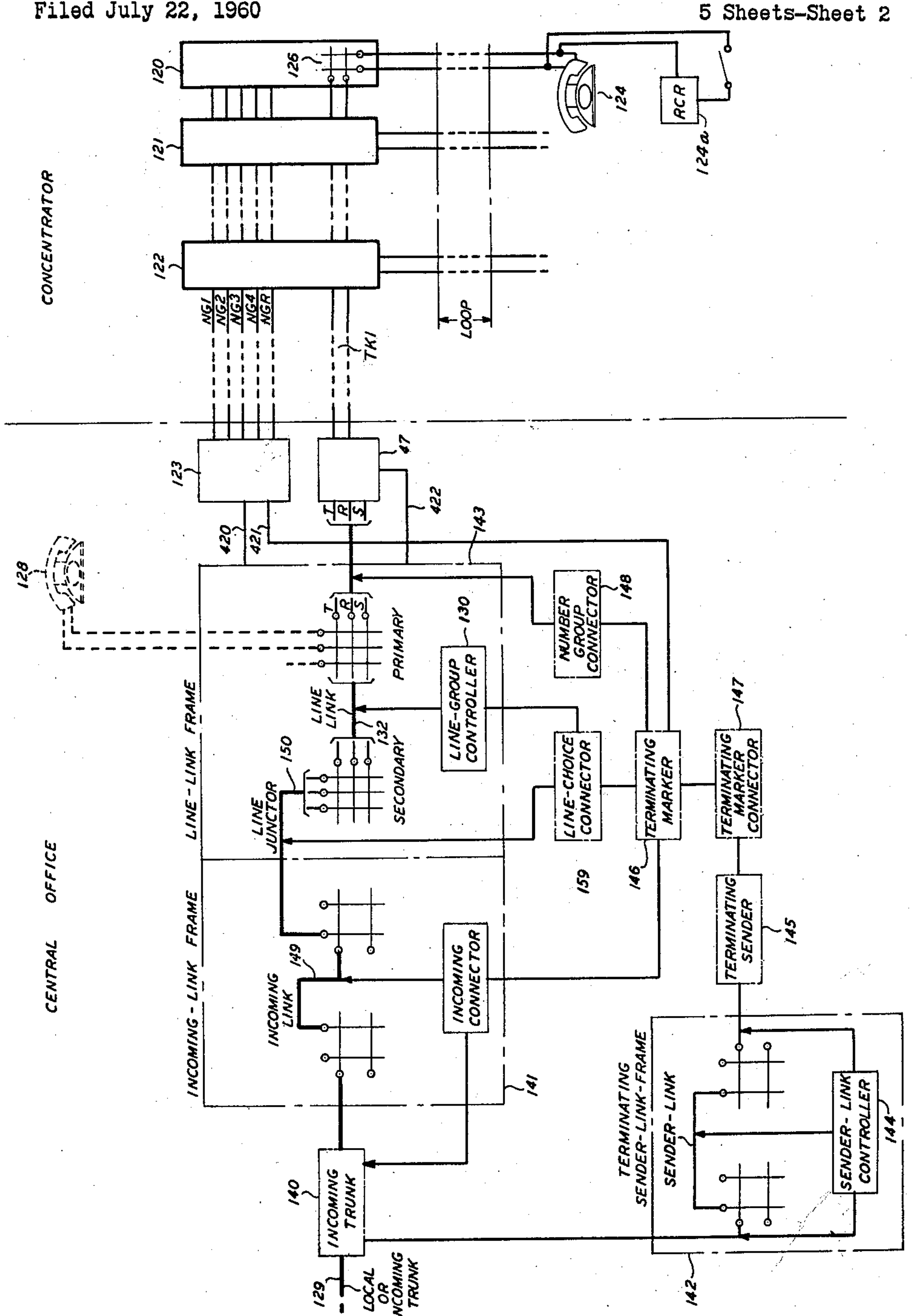
FIG. 1B illustrates a combined arrangement including the distributed concentrator and a No. 1 crossbar telephone office during the processing of a terminating call to one of the line packages.
Figure 2:
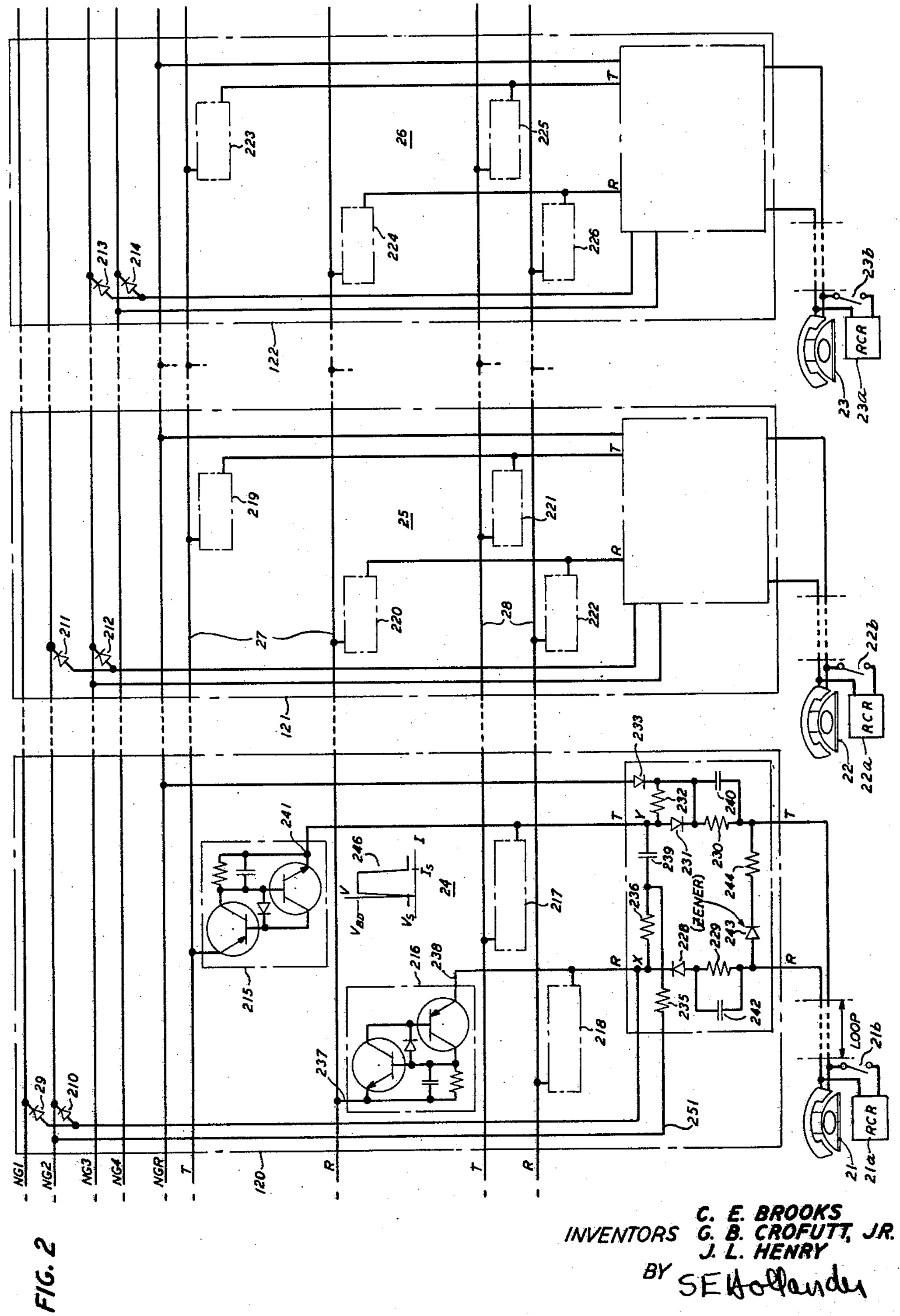
Figure 3:
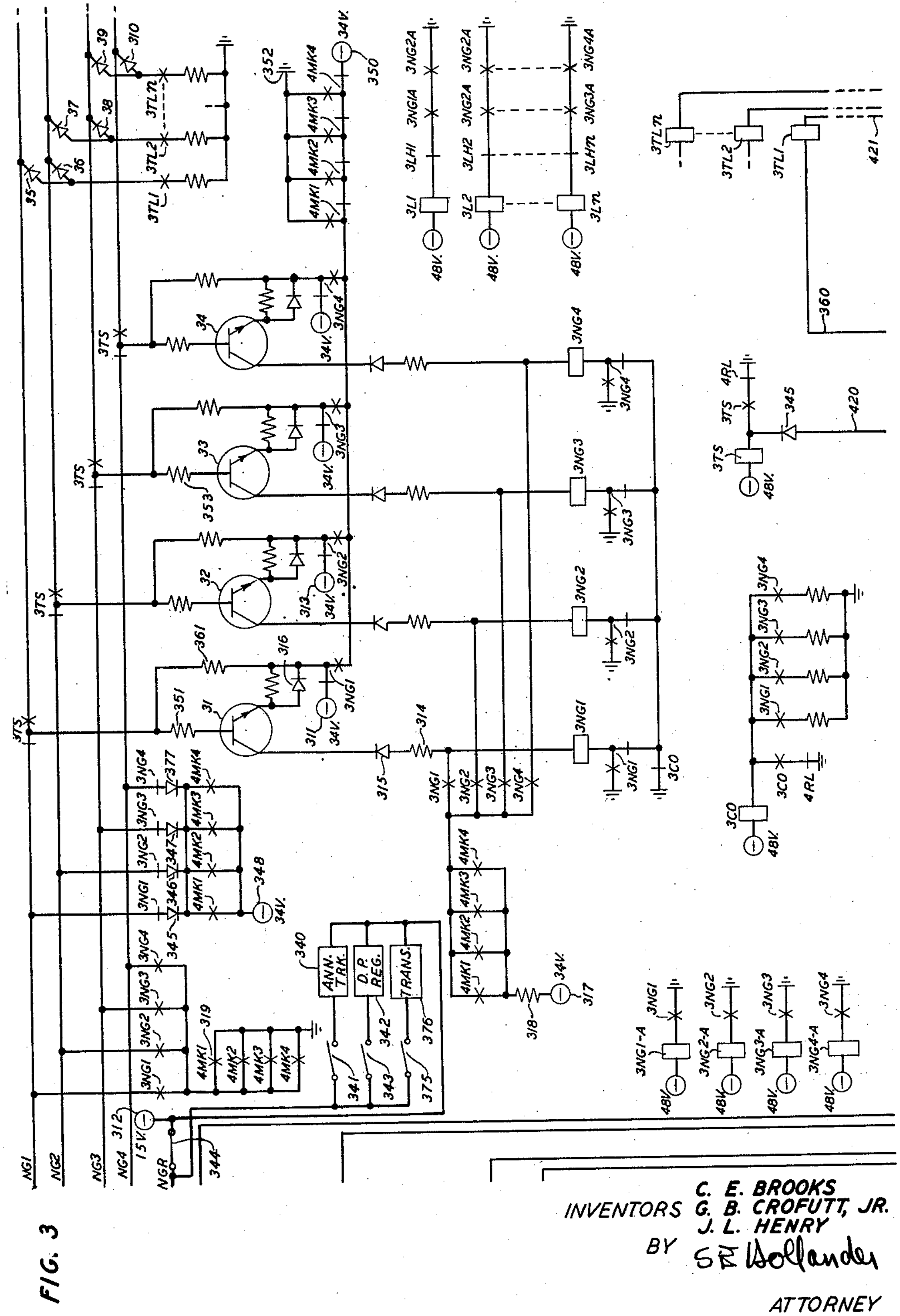
Figures 4, 5:
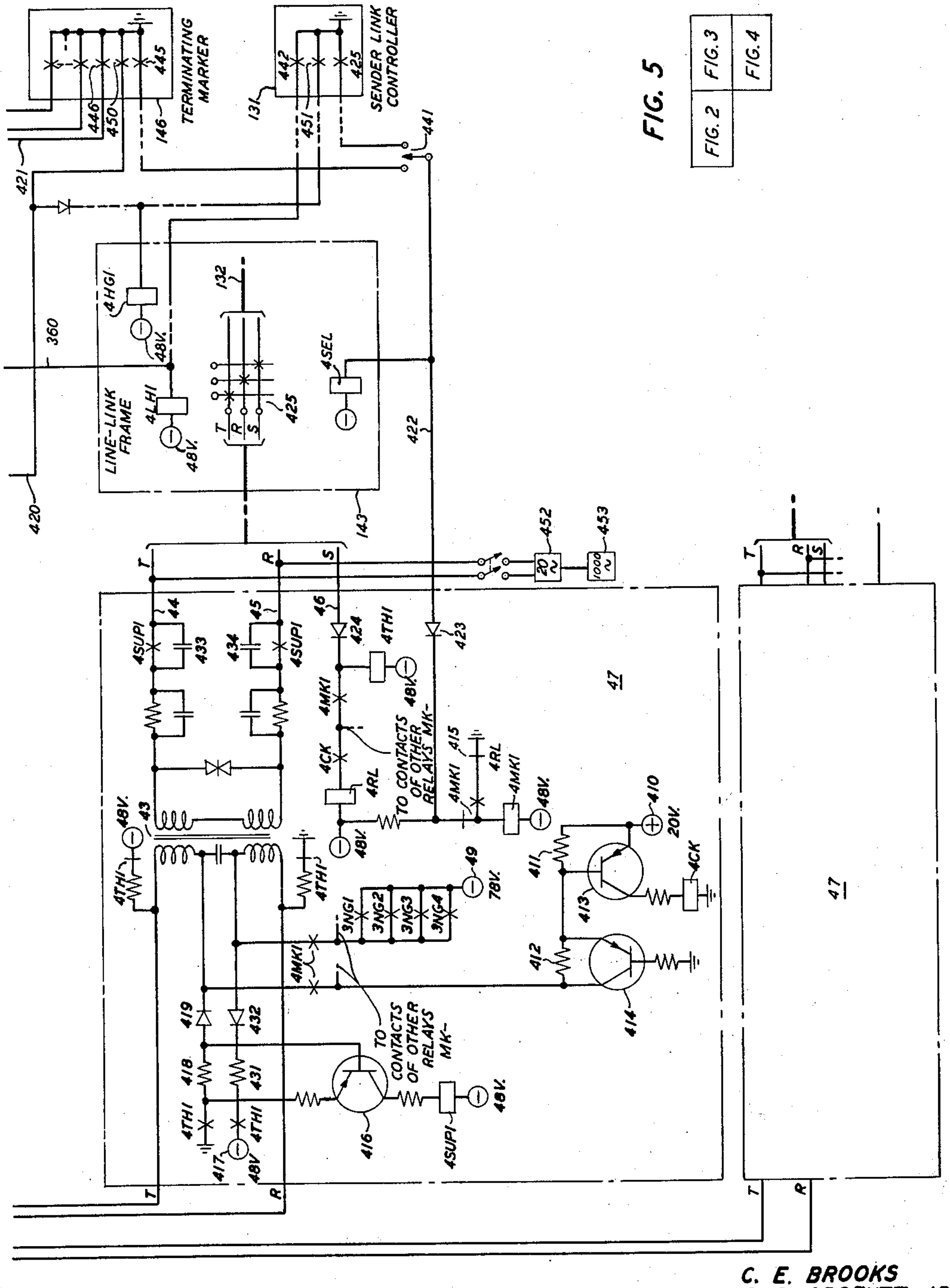

FIGS. 2–4 indicate the detailed structures of the equipment shown in outline form in FIGS. 1A and 1B wherein those structures have been added to or modified; and FIG. 5 depicts the advantageous arrangement of FIGS. 2–4 to disclose the present invention.

GENERAL DESCRIPTION OF OPERATION—ORIGINATING CALL

In accordance with an illustrative embodiment of the instant invention the distributed line concentrator system is shown incorporated in a conventional No. 1 crossbar telephone system. To assist in fixing the perspective of the following detailed description it will be useful at the outset to briefly demonstrate the advantageous manner in which the distributed line concentrator is operated in combination with the No. 1 crossbar system. An applique circuit for coupling the concentrator into the No. 1 crossbar system is also shown in an application of Brooks et al., Serial No. 44,760, filed on even date herewith.

Referring now to FIG. 1A, an outline diagram of the line concentrator apparatus as combined with the No. 1 crossbar office during the advent of an originating interoffice call from the concentrator is shown. More specifically a group of line packages 120–122 are shown each of which is connected to two of the four number group leads NG1–NG4 in accordance with a code described further herein. Moreover, each of the packages 120–122 is also connected to a common or return number group lead NGR.

A "Teletype" receiver 124*a* is connectable in bridge with the substation loop as explained further herein.

A number of speech trunks, of which trunk TK1 is shown as representative, are also connected to each of the line packages. The number group leads terminate at the central office in an applique circuit 123 which is employed for identifying substations which are originating service requests and for other control operations explained further herein.

It is manifest from the drawing that trunk conductor TK1 is upon termination at the central office extended to the horizontal level of a primary crossbar switch in the line link frame.

For purposes of describing the operation of the invention in a general manner, it will be assumed that a party at substation 124 is seeking to effect a connection through the central office to a distant subscriber. When the substation 124 goes off-hook, current flows through particular number group leads connected through line package 120 to substation 124 as explained further herein. More specifically, current flows through the two number group leads NG1 and NG2 to which substation 124 will, for the purposes of the illustration, be assumed to be connected. In this respect it will be remembered that line packages 121 and 122 are each connected to other unique combinations of the number group leads NG1–NG4 to specifically identify them.

The current which flows in number group leads NG1 and NG2 as a result of the off-hook condition at substation 124 is detected at the central office in applique circuit 123 in a manner explained in detail herein and an identification of the calling substation is made through a translation of the number group leads carrying current.

As a result of the identification, a line relay (not shown in FIG. 1, but shown in detail in FIG. 3) is operated which is uniquely associated with the calling substation line.

In response to the operation of the line relay, the line group controller 130 and sender link controller 131 are energized. These controller circuits select an idle line link 132, district junctor 133, sender link 134 and sender 135 and operate necessary select and hold magnets to establish these connections. For a comprehensive description of the operation of this circuit, reference may be made to Patent No. 2,235,803 of W. W. Carpenter of March 18, 1941.

Simultaneously in response to the operation of the line relay, arrangements are made in circuit 123 to effect a connection to the substation by applying a marking potential to the number group leads NG1 and NG2 unique to that substation and by simultaneously applying a marking potential to the ring conductor of the selected trunk TK1. A crosspoint 126 is energized by the marking potentials as explained herein and a path is extended from substation 124 over the line loop to the line package 120, crosspoint 126, trunk conductor TK1, termination 47 at the central office to a horizontal multiple of the line link 132 on the line link frame 143 at the central office.

As soon as it is connected to the line, the subscriber sender 135 transmits dial tone to the calling subscriber and accepts and records the digits dialed at substation 124.

The subscriber sender 135 selects an idle originating marker 136 and passes the code of the called office and other necessary information to the marker through connector 137. The marker determines from the called office code the location of the corresponding trunk group on the output of the office link frames 138, locates a particular idle trunk 125 in the group and then determines idle paths through the district link and office link frames for connecting the district junctor 133 to the selected outgoing trunk 125. When these functions have been performed the marker operates the appropriate select and hold magnets to close the crosspoints and establish the connection to outgoing trunk 125.

The sender 135 then transmits the called line number to the terminating office and the connection is extended to the calling party.

Thus, it is apparent that substation 124 has been connected through the concentrator and No. 1 crossbar office to outgoing trunk 125 to complete the operation.

To demonstrate, for comparison, the manner in which a substation would have been connected to the line link frame in a conventional direct line connection, a line would extend as shown in dotted outline from the verticals on the line link frame to substation 128 which represents the prior art direct connected substation line.

In the present arrangement the tip and ring conductors on the verticals of the line link frame are of course omitted and instead the tip and ring horizontals (T and R) are extended out to the field and specifically to line package 120 over a speech trunk, for example TK1. The sleeve conductor on the line vertical may be used to advantage in a number of control operations for the applique circuit 123 as explained further herein. But in over-all aspect it is apparent that the distributed line concentrator has in effect resulted in the displacement of the vertical paths on the primary switch of the line link frame to numerous distant and independent locations as shown for example at crosspoint 126.

GENERAL DESCRIPTION OF OPERATION—TERMINATING CALL

Having thus described the operation of the invention in processing an originating call, the manner of operation in handling an interoffice terminating call will be demonstrated. Referring now to FIG. 1B it will be assumed that a call is to be extended from the incoming trunk 129 which extends from a remote office through the No. 1 crossbar office equipment and the line concentrator to substation 124.

It will be noted that the incoming trunk 129 terminates in an incoming trunk circuit 140 which includes supervisory and ringing equipment. The incoming trunk circuits appear on the horizontals of the incoming link frame 141 as shown and also on the horizontals of the terminating sender link frame 142. The incoming link frame 141 and the line link frame 143 collectively form the terminating grid network for completing the call through the crossbar office.

The sender link controller circuit establishes a path from the incoming trunk circuit 140 to a terminating sender 145 through a crossbar link similar to that in which the line group controller circuit 130 discussed above operates. When the terminating sender 145 is connected to the incoming trunk circuit 140 it receives the called line number over an interoffice trunk from the originating office (over a local trunk if an intraoffice call) and when the complete number has been registered connects to a terminating marker 146 through a terminating marker connector 147.

The terminating sender 145 then transfers the record of the called substation number to the terminating marker 146 which in turn selects an idle path from the incoming trunk circuit 140 to the line link horizontal to which termination 47 is connected. The marker determines on which line link frame the line is located through the number group connector 148 and connects to the desired line link frame through the line choice connector 159. The originating office sender is released when the record of the called number has been passed to the terminating sender 145. The marker then makes a called line busy test as on a nonconcentration call and if substation 124 is idle the marker extends the incoming trunk circuit through the incoming link 149, line junctor 150 and line link 132 to the horizontal on which trunk TK1 is terminated, equipment in terminating circuit 47 and applique circuit 123 are actuated to uniquely identify the number group leads associated with called substation 124 and to apply marking potentials to said number group leads and to the ring conductor of trunk TK1 to operate crosspoint 126. The incoming trunk applies ringing current to the called line and, when the call has been answered, maintains supervision.

Substation equipment 128 again shows in dotted outline the manner in which a substation would be connected to the line link frame 143 in accordance with prior art conventional practice thereby demonstrating the facility with which the horizontal level of the line link frame is in effect extended into the field where it appears at crosspoint 126 and numerous other physical locations. By energizing the crosspoint, as discussed above, it is possible to effect a connection to substation 124 in a manner analogous to that of the direct line connection.

Significantly, FIGS. 1A and 1B clearly indicate the minimal invasion of conventional (existing) central office equipment necessary to incorporate the concentrator equipment.

For a complete explication of the operation of the equipment of FIG. 1B shown in "dot-dash" outline, reference may be made to Patent 2,089,921 of W. W. Carpenter of August 10, 1937.

GENERAL DESCRIPTION OF MAJOR COMPONENTS

Referring now to FIG. 2 a group of substations 21, 22 and 23 and line "packages" 120, 121 and 122 are shown. Two trunks 27 and 28 are also shown. For purposes of clarity the number of substations and trunks have been minimized although the principles involved in the operation of a larger group of substations and trunks are identical.

Four number group return leads NG1–NG4 extend from the central office of FIGS. 3 and 4 and are connected to each of the substations 21–23 in accordance with a prearranged code such that each package is connected to a unique set of number group leads over diodes 29, 210 and 211 through 214. A common number group or return lead NGR is connected to each of the packages.

Each of the substations is connectable to each of the trunks over a balanced path including transistor crosspoints 215 through 226, of which only transistor crosspoints 215 and 216 are shown in detail for clarity.

Each of the substations also includes connected in parallel therewith a code receiving unit which may illustratively be a "Teletype" receiver such as receivers **21*a*–23*a*. It is understood that the manner of connection of these units shown symbolically is well known and is arranged in a manner to prevent interference with normal usage of the telephone instrument. Thus the "Teletype" receivers include isolating circuitry (shown symbolically as switches 21*b*–23*b***) to prevent such interference.

A "Teletype" transmitter 376 is shown in FIG. 3 which is connectable in series with the number group return lead by opening switch 344 and closing switch 375. A description of the operation of this equipment appears herein.

Thus, substation 21 has access to trunk 27 over crosspoints 215 and 216 and access to trunk 28 over crosspoints 217 and 218. The loop of the substation 21 is connected to the crosspoints through a group of control diodes, resistors and capacitors shown in detail for substation 21, the function of which will be described in further detail herein.

It is significant to appreciate that each of the substation line packages 120–122 is illustratively removed from each other by substantial physical distances as indicated symbolically by the broken lines in the number group leads and speech trunks between the line packages. In this sense, package 120 which is in effect a portion of the remote control equipment and switching equipment for the concentrator individual to substation 21 is advantageously physically disposed at a location which is closest in contiguity to that substation.

It will be noted that each of the trunks 27 and 28 extends through locations contiguous to each of the substations 21–23 and also to the central office as indicated in FIGS. 3 and 4. More specifically, it may be seen that trunk 27 is terminated at the central office by transformer coupling through transformer 43 to conductors 44 and 45 which in turn extend with control lead 46 to a horizontal level 425 of a crossbar switch in the line link frame on which trunk 27 is terminated as shown in outline form in FIG. 1A for trunk TK1.

Trunk 28 is terminated in a similar manner and the details of the termination 47 are omitted to preserve clarity.

In order to determine the identity of a line which is requesting service, number group detectors 31–34 are provided. These transistor detectors are responsive to current flow in number group leads NG1–NG4, respectively, to operate the corresponding relays 3NG1–3NG4 of FIG. 3.

In addition, a group of coding diodes shown at 35–39 and 310 are used to mark the corresponding number group leads for terminating calls.

A group of individual line relays unique to each line are shown at relays 3L1–3L*n* of which only three relays are shown for clarity. It will be assumed herein that relay 3L1 uniquely corresponds to substation 21, relay 3L2 to substation 22 and relay 3L*n* to substation 23 of FIG. 2.

Having thus described in a general manner the operation and equipment incorporated in applicants' invention, illustrations of typical operating patterns will follow.

DETAILED DESCRIPTION

*Originating Call*

For purposes of illustration it will be assumed that substation 21 is initiating a call. When the subset goes off-hook, a circuit is completed through the substation 21 to allow current to flow between the tip and ring conductors of the line over a path which includes battery 311, contacts of relay 3NG1, resistance 361, normally closed contacts of relay 3TS, conductor NG1, diode 29, terminal X in the subscriber line package 120, diode 228, resistance 229, the ring lead R of the subscriber's line loop through the substation 21, the tip lead T of the subscriber's loop, resistance 230, diode 233, number group return lead NGR to negative battery 312. A similar path may be traced from negative battery 313 over number group lead NG2.

The current which flows in leads NG1 and NG2 forward biases transistors 31 and 32 driving said transistors into the conducting state. The energization of these transistors results in the operation of relays 3NG1 and 3NG2 over similar paths, which for relay 3NG1, may be traced from ground, contacts of relay 3C0, contacts of relay 3NG1, winding of relay 3NG1, resistance 314, diode 315, collector-emitter path of transistor 31, diode 316, contacts of relay 3NG1 to battery 311. On operating, relay 3NG1 locks operated over its normally opened contacts to ground.

Relays 3NG1–A and 3NG2–A now operate over the contacts of relays 3NG1 and 3NG2.

When relay 3NG1 operates, the 34-volt negative potential applied from battery 311 is disconnected by the normally closed contacts of relay 3NG1 in series therewith. Battery 313 is similarly disconnected.

Operation of relay 3NG1 establishes a locking path to battery 350 through the normally closed contacts of relays 4MK1 through 4MK4, contacts of relay 3NG1, resistance 361, resistance 351, base of transistor 31, collector of transistor 31, diode 315, resistance 314, winding of relay 3NG1, contacts of relay 3NG1 to ground.

It will be noted that the contacts of relays

3NG1-A—3NG4-A are connected in series in appropriate codes (which, for purposes of illustration, is the two-out-of-four code) with line relays 3L1–3L*n*. Thus, as a result of the operation of the relays 3NG1-A and 3NG2-A, relay 3L1 is operated over the contacts thereof and the contacts of relay 3LH1.

Relay 3C0 is operated over an obvious path including the contacts of relay 3NG1. In operating, the contacts of relay 3C0 interrupt the operating ground from the windings of all other relays 3NG–, thereby preventing any other relays 3NG– from operating.

It is significant to note that relay 3L1 is the same line relay which is operated in the No. 1 crossbar system for substation 21 if substation 21 had been directly connected to the central office in lieu of concentration.

In response to the operation of line relay 3L1 the No. 1 crossbar system is operated in the conventional manner as disclosed in FIG. 1A. Thus the line group controller 130 and a sender link controller 131 are energized to select an idle line link, district junctor, sender link and sender and the necessary select and hold magnets to establish the connection are operated.

When the line link primary select magnet 4SEL is operated in the conventional manner (as disclosed in the above-referred-to patents) a trunk mark relay 4MK1 associated with the selected line link 132 is operated in parallel with the select magnet 4SEL. For simplicity, the operation is shown symbolically by actuation of contacts 425 and operation of switch 441 to the right position. Relay 4MK1 locks operated over its normally open contacts and the contacts 415 of relay 4RL.

The line hold magnet 4LH1 and horizontal group magnet 4HG1 are also conventionally operated or described in the above-referred-to Carpenter patents. For simplicity, they are shown here as operated by contacts 451 and 442, respectively.

Operation of relay 4MK1 interrupts the path to minus 34-volt battery 350 and applies ground to leads NG1 and NG2 over a path including ground at 352, contacts of relay 4MK1, contacts of relays 3NG1 and 3NG2, resistances 361 and 353, contacts of relay 3TS to leads NG1 and NG2, respectively. The application of ground potential to the emitter and base of transistors 31 and 32 turns those transistors off. (Conventional holding circuits in the line link frame are omitted to preserve clarity. Reference may be made to the Carpenter patents supra, for suitable holding circuits.)

A holding path for relay 3NG1 may now be traced from battery 317, resistance 318, contacts of relay 4MK1, contacts of relay 3NG1, winding of relay 3NG1, contacts of relay 3NG1 to ground. A similar path may be traced for relay 3NG2.

*Marking Number Group Leads*

A ground potential is also applied to number group lead NG1 and NG2 over the contacts 319 of relay 4MK1 and the contacts of relays 3NG1 and 3NG2.

Also a negative potential of minus 78 volts is applied to the ring conductor R of the concentrator trunk 27 over a path including source 49, contacts of relay 3NG1 (and 3NG2), contacts of relay 4MK1, transformer 43, ring conductor of trunk 27 to the ring crosspoints 216, 220 and 224.

A positive potential of 20 volts may be traced from source 410, resistance 411, resistance 412, contacts of relay 4MK1, transformer 43 to the tip conductor T of trunk 28 and to crosspoints 215, 219 and 223.

It may be seen that when the number group leads 1 and 2 were shifted from the standby potential of minus 34 volts (at source 311, etc.) to the mark potential of 0 volt, unique potential conditions were established at crosspoints 215 and 216. Thus, the potential at terminal X of line package 120 will be at ground potential in view of the ground potential over diodes 29 and 210 and the ground potential over resistances 235 and 236. Diode 228 isolates terminal X from negative potentials on the loop. Since all other line packages have at least one number group diode connected to a number group lead at minus 34 volts at source 348, the corresponding terminal X (not shown) in those packages will be at substantially minus 34 volts.

The voltage of minus 78 volts applied to the ring conductor as described above appears at terminal 237 of transistor crosspoint 216 and ground potential is applied to conductor 238 of crosspoint 216 to break down the crosspoint over a path including resistances 236, 235, conductor 251 to lead NG2. All other crosspoints (220 and 224) have a total voltage thereacross of substantially 44 volts which is inadequate to break down the crosspoint. In the illustrative transistor crosspoint elements shown, it will be assumed that the crosspoints are operative in response to a triggering voltage of substantially 50 volts. This factor is more graphically apparent from wave form 246 in which the characteristic of the crosspoint is shown.

It is seen from characteristic 246 that for voltage below the breakdown voltage $V_{BD}$, no significant current flow takes place. When the breakdown voltage is exceeded, the sustaining voltage $V_S$ drops to a relatively low value and the crosspoint switches change to a low impedance state.

The voltage is controlled in order to prevent it from falling below the sustaining voltage $V_S$ and the crosspoint is maintained in the low impedance state. The abrupt change of voltage between states generates a negative pulse at the crosspoint 216 which may be traced over to the tip side T of the loop. This path extends through resistance 236 and capacitor 239 to the tip side T of the subscriber's loop at terminal Y is drawn negative to some value approaching minus 70 volts. This voltage is applied to terminal 241 of crosspoint 215. Since it was previously demonstrated that a positive 20-volt signal was applied to the tip conductor of trunk 28, crosspoint 215 is energized and driven to a low impedance state. No other crosspoint elements (219, 223) connected to the tip conductor of the trunk 27 are energized since the terminals Y (not shown) in the corresponding line packages do not experience any voltage excursion. For a detailed description of the operation of suitable crosspoints, reference may be made to Patent 2,655,609 of W. Shockley of October 13, 1953.

It has thus been demonstrated that crosspoints 216 and 215 have been operated to provide balanced connections between the ring conductor of trunk 27 and the ring conductor of substation 21 and between the tip conductor of trunk 27 and the tip conductor of substation 21.

When the transistor crosspoints 215 and 216 have been operated, current from the source 210 flows through resistances 411 and 412 and over the trunk and loop to forward bias transistors 413 thereby operating relay 4CK. Operation of relay 4CK verifies crosspoint closure and causes the operation of relay 4RL over the contacts of relays 4CK and 4MK1, diode 424, conductor 46, and the conventional sleeve ground applied over the line link 132 as explained in the above-mentioned Carpenter patents. Relay 4TH1 has previously operated over the sleeve ground. Transistor 414 is used in the circuit as a current limiting device operative in response to current flow through resistance 412.

Relay 4RL in operating removes the holding ground from relay 4MK1 at contacts 415.

Relay 4MK1 in releasing removes the minus 78-volt potential from the ring conductor by opening its contacts in series with source 49. Similarly the potential from source 410 is interrupted at the contacts of relay 4MK1 connected to diode 419. Current flows from minus 48-volt battery 417 to forward bias transistor 416 and thereby operate relay 4SUP1.

Release of relay 4MK1 as described above also results in the release of relays 3NG1 and 3NG2 in view of the opening of the contacts of relay 4MK1 in series with the holding path thereof to restore the number group circuit to normal.

At this time ground potential is connected to the tip conductor over the contacts of relay 4TH1, resistance 418 and diode 419, and minus 48 volts is applied to the ring conductor R over the contacts of relay 4TH1, resistance 431 and diode 432. This potential is adequate to hold the crosspoints in the conducting state.

Application of the talking voltage causes the number group diodes in the line packages to be back-biased thereby isolating trunk 27 from the number group leads with the exception of a path through resistance 235. But since resistance 235 is connected to a balanced point on the loop and since the resistance of the number group lead NG2 to which resistance 235 is connected is small relative to the resistance 235, crosstalk between busy circuits is minimal. On the tip side of the loop diode 233 is back-biased by the hold voltage thereby isolating the number group return lead NGR from the busy circuit.

The resistance-capacitance combination including resistance 229 and capacitor 242 in parallel and resistance 230 and capacitor 240 in parallel in the tip and ring circuits insure that the diodes in the number groups 29 and 210 and diode 233 to the number group return lead NGR will remain back-biased even if a momentary short circuit occurs across the loop terminals of a line package.

*Dialing Operation*

Current now flows over the path through the subset described above and the substation 21 receives dial tone from the subscribed sender 135 in the manner conventionally employed in the No. 1 crossbar system as described above. As is usual a series of pulses or line open conditions is generated during the dialing sequence. Since transistor crosspoints as utilized at crosspoints 215 and 216 require continuous current flow therethrough in the "on" state, provisions must be made to insure continued current flow during the time the dial contacts open the circuit.

This is accomplished by use of Zener diode 243 and resistance 244 across the tip and ring conductors of the loop as shown in FIG. 2. Current continues to flow through the trunk to the central office and the transistor crosspoints 215 and 216 through diode 243 and resistance 244 until the dial contacts again close the circuit. In view of the IR drop across resistances 229 and 230 when the subset is off-hook, no current flows through resistance 244 at that time, the threshold voltage of Zener diode 243 being designed to prevent this condition.

The called party's directory number is registered in the central office in response to the dialed information in the conventional manner of No. 1 crossbar systems whereupon control actions are initiated to effect a connection to the called party.

It will be noted that the dialing signal and other supervisory signals are recognized at the central office by the IR drop across resistance 418 which gates transistor 416 to operate relay 4SUP1. These signals are repeated at the contacts of relay 4SUP1 to open and close the circuit to the line link over conductors 44 and 45.

After the called party is reached, supervision by the No. 1 crossbar office is conventional.

When the subscribers disconnect, the district junctor releases the trunk circuit 27 experiences a battery reversal at the normally closed contacts of relay 4TH1 to insure crosspoint release.

It will now be assumed that an incoming call or terminating call is to be made to a subscriber connected to a concentrator system in accordance with the present invention. For purposes of simplification, it will be assumed that substation 21 is now the called or terminating station.

*Terminating Calls*

When the terminating marker establishes an incoming call to the called line, as discussed above (FIG. 1B), it selects an idle channel through the appropriate crossbar switches to the horizontal group of the line link frame on which the called line appears. The line vertical in the central office unique to substation 21 is operated in a conventional manner to enable circuits described further herein to mark the proper line at the concentrator.

Relay 3TS is operated by the terminating marker at contacts 450 over a path including conductor 420, diode 345, winding of relays 3TS to negative battery. A similar circuit may be traced for the operation of relay 4HG1.

More specifically, the terminating marker after making a directory to equipment number translation extends a ground connection (shown symbolically by operation of contacts 445 and momentary movement of switch 441 to the left position) to operate relay 4SEL on the line link frame. Another ground connection is extended over contacts 446, relay 3TL1, conductor 360, to operate hold magnet 4LH1. It is apparent that the calling subscriber's line is not connected to the vertical path (tip and ring) on the crossbar switch but it is a significant advantage of the instant invention that the office equipment is unaware of the omission of the concentrator substation line and proceeds in the usual manner to effect a connection thereto. In this manner the internal reconstruction of equipment in the No. 1 crossbar office is held to a substantially irreducible minimum.

A polar relay 3TL– is provided for each concentrator line and operates when the marker operates the line hold magnet 4LH–. Thus relays 3TL1 and 4LH1 are operated over the contacts 446 in the marker and conductor 421. Relays 3TL2 and 3TLN corresponding to substations 22 and 23 are also shown although the connections to respective hold magnets are omitted to preserve clarity.

The ground which was extended to operate the line link primary select magnet 4SEL through contacts 445 in the marker circuit also extends over conductor 422 and diode 423 to operate relay 4MK1. Ground on the sleeve circuit S (conventionally applied over the line link 132) operates relay 4TH1 over conductor 46, diode 424 and the winding of relay 4TH1. The terminating marker now releases in accordance with the usual practice.

Operation of relay 3TS transfers the operating path of the number group transistors 31–34 from the number group leads NG1–NG4 to corresponding number group leads in the applique circuit translator over the contacts of relay 3TS.

The operation of relay 3TL1 described above provides a ground potential over diodes 35 and 36 to the transistors 31 and 32 causing those transistors to be forward-biased thereby operating relays 3NG1 and 3NG2 in a manner similar to that described above for an originating call. Operation of relay 3NG1 results in the operation of relay 3NG1A and operation of relay 3NG2 results in the operation of relay 3NG2–A over obvious paths. The contacts of relays 3NG1–A and 3NG2–A in series with relay 3L1 again result in the operation of that relay thereby uniquely designating the selected line.

Corresponding translations over the contacts of relays 3TL2, 3TLN and diodes 37, 38, 39 and 310 are similarly available for substations 22 and 23.

Provisions are now made for marking the appropriate number group leads to energize transistor crosspoints 215 and 216 to connect substation 21 to the selected trunk. The marking operation is accomplished in the manner described above for an originating call by applying a ground potential to the number group leads NG1 and NG2 over the contacts 319 of relay 4MK1 and the contacts of relays 3NG1 and 3NG2. At the same time a minus 78-volt potential from source 49 is applied to the ring conductor of trunk 27 over the contacts of relays 3NG1, 3NG2 and 4MK1 and a plus 20-volt potential to the tip conductor from source 410 over the contacts of relay 4MK1. The resulting potentials at the line package 120 are the same as those experienced in the marking operation for an originating call and transistor crosspoints 215 and 216 are energized in a similar manner.

Here again when the transistor crosspoints 215 and 216 have been operated current from the source 410 flows through resistances 411 and 412 to forward bias transistor 413 thereby operating relay 4CK verifying crosspoint closure. Operation of relay 4CK operates relay 4RL through the closing of the contacts of relay 4CK in series therewith.

Relay 4RL, in operating, releases relay 4MK1 at contacts 415 and relay 3TS releases in view of the opening of the contacts of relay 4RL in series with the holding circuit thereof.

Relay 4MK1 in releasing removes the minus 78-volt potential from the ring conductor by opening contacts in series with source 49. Similarly, the potential from source 410 is interrupted at the contacts of relay 4MK1 connected to the tip conductor.

A ringing signal is now applied to actuate the horn "ringer" at substation 21 which may illustratively be a low current subset, as described in Patent 2,850,650 of September 2, 1958, of L. A. Meacham.

Illustratively a 1000-cycle ringing tone 451 in series with the conventional 20-cycle ringing tone 450 may be used. The condensers 433 and 434 bridged across the contacts of relay 4SUP1 are designed to offer a high impedance to the 20-cycle tone and a much lower impedance to the 1000-cycle tone. In addition, transformer 43 causes a high transmission loss at 20 cycles and passes 1000 cycles with negligible loss. Consequently, the 1000-cycle tone is transmitted over the line to assure proper operation of the ringer at substation 121.

When the called subscriber answers, the subset resistance causes an increase in the hold current which is detected by relay 4SUP1 at the central office as a called subscriber "answer signal" and ringing is discontinued in a well-known manner.

Supervision of the call is thereafter in accordance with usual practice and release of the connection is similar to that described above for an originating call.

*Auxiliary Transmission Circuit*

It will be noted from reference to FIG. 2 that each subscriber substation, e.g., substation 21, is connected over the conventional loop to a number of diodes 29 and 210 on the ring side of the loop through resistance 229 and diode 228 and is connected on the tip side of the loop to the number group return lead NGR over diode 233, resistance 232, diode 231 and resistance 230. It will further be recalled that on an originating call the receiver off-hook condition completes a circuit through the aforementioned diodes and causes current to flow through the subset and loop to the central office at which the identification of the number group leads carrying current initiates the appropriate switching operations all as described heretofore. It may seem that the number group leads NG1–NG4 and the number group return lead NGR are a complete path to the telephone central office and, in fact, may be utilized to provide a transmission channel to a subset if the communication trunks 27 and 28 are disabled or otherwise unavailable.

This aspect of the invention is particularly advantageous in the "percentage" or shared type of switching apparatus, since a condition of all-concentrator-trunks-busy will not preclude the opportunity of advising a would-be caller of the condition.

Thus, number group lead NGR is provided with an announcement trunk 340 which is symbolically serially connectable to the number group lead by opening switch 344 and closing switch 341. Advantageously the announcement trunk 340 may be automatically connected to the number group return lead by well-known apparatus when all of the communication trunks remotely extending from the office are busy. The announcement trunk may be adapted to provide prerecorded messages which would be delivered to the calling subscriber over the number group return lead NGR advising him of the reasons for the service delay and requesting that he reattempt his call after a suitable waiting period.

Alternatively and perhaps even more vital so far as public service is concerned are the dial register facilities shown in outline form at 342 which are symbolically serially connectable to the number group lead NGR over switch 343. In practice, this connection may be made by automatic apparatus in a well-known manner which may, for example, be similar to that shown supra for the connection of subscriber sender 135.

The unique advantage which flows from the facilities for supplying a dial pulse register 342 for each number group lead NGR derive in part from the fact that this arrangement makes it possible for a would-be calling subscriber who, under other circumstances, i.e., because of an all-trunks-busy condition, etc. cannot effect a calling connection to the central office may, for example, by dialing the digit 0 over the number group lead NGR into the dial pulse register 342, be connected to a telephone operator.

The availability of this unique by-path or auxiliary transmission path which is wholly independent of the usual communication trunks enables a subscriber who is urgently in need of assistance in consequence of emergency conditions or otherwise to effectuate voice communication to an operator at the central office who may then proceed over other channels to initiate the action required, i.e., dispatch of police, emergency medical equipment, etc.

In effect, the availability of this type of direct channel to the central office in complete independence of the conventional transmission channels elevates the grade of service provided to subscribers to the present distributed line concentrator above those of conventional concentrator subscribers and even above those of private line subscribers who have a direct line to the central office, for at least two reasons. First, the latter or private line subscribers are limited to the single transmission path provided by their individual loop and the limitations imposed thereby; and second, the same subscribers are limited at the central office from the switching standpoint in view of the percentage connection or shared arrangement of their lines. Thus, if the common control equipment is unusually heavily burdened, there may be a substantial delay before the subscribers are granted access for signaling purposes.

In contrast, the distributed line concentrator customers are provided with a unique independent channel when usual transmission facilities fail.

It will be noted that it is also possible in practicing this invention to provide a common or "conference" channel utilizing the number group leads for speech transmission in a manner analogous to that described above for individual utilization of the number group leads in the event of an all-trunks-busy condition. The conference technique is effected over the number group leads by prearrangement in a manner calculated to produce ringing at the appropriate substations as described above. When a subscriber removes his receiver he is connected through the number group leads to all other subscribers who have similarly removed their receivers. At this time no attempt is made to mark the lines to a particular trunk. Instead all are permitted to converse over the number group leads.

Also, as alluded to in the general description, another alternative provides for communication over the number group leads with the "Teletype" receiver units *21a–23a* which are connected in bridge with the substations 21–23, respectively, through switches *21b–23b*. With this arrangement, at appropriate times, the "Teletype" receiver unit may be operated by closing the respective switch to receive "broadcast" messages from the "Teletype" transmitter 376 which is symbolically connectable through the operation of switch 375 and the opening of switch 344.

It is also apparent that access is available in a similar manner (e.g., when the dial pulse register 342 is energized to summon an operator) for "broadcast" transmission over the number group return lead from a single individual through the central office to a plurality of substations over the number group return lead.

It will also be apparent to those skilled in the art that in appropriate circumstances (e.g., where a plurality of lines are closely spaced physically), the line packages may be adjacent one another in the same physical location.

It is understood that the foregoing embodiments are merely exemplary and that various modifications may be made by those skilled in the art without departing from the invention.

What is claimed is:

1. A distributed line concentrator system including a telephone central office, a plurality of signaling trunks and a plurality of communication trunks connected to said office, a plurality of substations greater in number than said trunks and remotely located from said central office and from each other, and a plurality of remote concentrator units individual to said substations, each of said units being positioned in closer proximity to said respective individual substation than to other substations, said communication trunks including tip and ring conductors, said units including means connecting said substations to said signaling trunks in accordance with a code, said units including means under control of said central office for connecting said tip and ring conductors to said substations.

2. A distributed telephone line concentrator system including a telephone central office, a first and second plurality of trunks extending from said office, a plurality of substations greater in number than said trunks and remotely located from said central office and from each other, a plurality of remote concentrator units individual to said substations, said units being physically distributed along the length of said trunks in accordance with the physical location of said substations, said concentrator units including means connecting said substations to selected ones of said first plurality of trunks, said units including additional means for connecting said substations to said second plurality of trunks in accordance with control signals from said central office, and means at said central office responsive to an off-hook condition at a calling one of said substations for energizing said first plurality of trunks to effectuate a connection between said calling substation and a selected one of said second plurality of trunks.

3. A distributed telephone line concentrator system including a central office, a plurality of number group leads and a plurality of speech trunks remotely extending from said central office, a plurality of substations greater in number than said trunks remotely located from said office and from each other; a plurality of remote concentrator units individually contiguous to said substations and physically distributed along the length of said trunks and number group leads in accordance with the relative physical locations of said substations, said units including switching means connecting said substations to said number group leads in accordance with a code, and means under control of said central office for connecting said substations to selected ones of said speech trunks; and means at said central office responsive to a signaling condition at one of said substations for energizing said number group leads and a selected one of said speech trunks to actuate said switching means at said remote unit individual to said one substation to establish a connection between said one substation and said selected trunk.

4. A distributed telephone line concentrator system including a central office, a plurality of speech trunks and number group leads extending in parallel from said central office, a plurality of substations greater in number than said trunks, said substations being remotely located from said office and from each other, a plurality of concentrator units individually contiguous to said substations and physically disposed along the parallel extension of said trunks and number group leads in accordance with the physical location of said substations, loop conductors joining said substations to said units, said units including means connecting said substations to said number group leads in accordance with a code and switching means under control of said central office for effectuating a balanced connection between said substations and said speech trunks, means at said central office responsive to the energization of said number group leads in response to a signaling condition at one of said substations for detecting the identity of said substation, and means responsive to the operation of said last-mentioned means for energizing said number group leads and a selected one of said speech trunks to actuate said switching means at said unit individual to said one substation to establish a connection between said signaling substation and a selected one of said trunks.

5. A distributed telephone line concentrator system in accordance with claim 4 including in addition means at each of said concentrator units connected in parallel with said substation to prevent release of said connection to said speech trunk during transient signaling conditions at said substations, said means including a Zener diode and a resistance serially connected across said loop conductors.

6. A distributed telephone line concentrator system in accordance with claim 4 wherein said means for connecting said substations to said number group leads include rectifier means.

7. A distributed telephone line concentrator system in accordance with claim 6 including in addition a resistor and capacitor serially connected across said loop conductors, and impedance means coupling the junction between said resistor and capacitor to one of said number group leads.

8. A distributed telephone line concentrator system including a central office, a plurality of number group leads and a plurality of speech trunks extending in parallel from said central office, a plurality of substations greater in number than said trunks remotely located from said central office and from each other, a plurality of remote concentrator devices individual to said substations and disposed along the length of said speech trunks and number group leads in accordance with the physical disposition of said substations, loop conductors joining said substations to said devices, said devices including rectifier means for joining said number group leads to said substations in accordance with a code, said devices including in addition switching means for connecting said substations to said speech trunks, and control means at said central office responsive to a terminating call to one of said substations for applying marking potentials to said number group leads to which said substation is connected and to a selected idle one of said trunks, said switching means at said concentrator being responsive to the operation of said control means to establish a balanced connection between said selected trunk and said one substation.

9. A distributed telephone line concentrator system in accordance with claim 8 including in addition means at said central office responsive to the connection of said one substation to said trunk to remove said marking potentials and to apply talking potentials to said trunks.

10. A distributed telephone line concentrator system including a central office, a plurality of signaling conductors and a plurality of speech trunks extending in parallel form to a remote location from said office, a plurality of substations greater in number than said trunks, said substations being remotely located from said office and from each other, a plurality of remote concentrator units physically disposed along the length of said signaling conductors and speech trunks in accordance with the relative physical location of said substations, loop conductors coupling said substations to said units, said units including rectifier means for coupling said substations to said signaling conductors, said units additionally including switching means for connecting said substations to said speech trunks in accordance with control signals from said central office, means at said central office responsive to a signaling condition at one of said substations for energizing said switching means to establish a connection between said one substation and a selected idle one of said trunks, and additional means at said central office for thereafter reverse biasing said rectifier means connected to said one substation thereby to isolate said selected trunk circuit from said signaling conductors.

11. A distributed telephone line concentrator system in accordance with claim 10 including in addition means at said central office responsive to a terminating call to a called one of said substations for effectuating a connection between said one substation and a selected idle speech trunk, and means at said cental office for thereafter applying ringing signals to said selected trunk, said ringing signals including a composite signal of at least two separate frequencies, and means intermediate said trunk and said ringing means for suppressing one of said ringing frequency signals.

12. A distributed telephone line concentrator system in accordance with claim 11 including in addition supervisory relay means at said office responsive to an answer condition at said called substation to indicate said answer condition.

13. A distributed line concentrator system including a central office, a plurality of speech trunks connected to said central office, a plurality of number group leads and a number group return lead connected to said central office, a plurality of remote substations greater in number than said trunks, individual switching means for each of said substations, said individual switching means including means for connecting each of said substations to selected number group leads in accordance with a code, means for connecting each of said substations to said number group return lead, and crosspoint means for connecting said substations to said speech trunks under control of said central office, said individual switching means comprising a plurality of physically separated remote units contiguous to said substations.

14. In a distributed telephone line concentrator system, a central office, a plurality of speech trunks connected to said central office, each of said trunks including a pair of conductors, a plurality of number group leads connected to said central office, a number group return lead connected to said central office, a plurality of substations greater in number than said trunks, a plurality of line packages, said packages being physically disposed in geographically separate and distinct locations continuous to said substations, loop conductors joining said substations to said packages, said packages including means for connecting said substations to selected ones of said number group leads in accordance with a code and for connecting said substations to said number group return lead, means in said package for connecting said substations to said trunks under control of said central office including first crosspoint means connectable to one conductor of said speech trunk and one conductor of said substation loop, and second crosspoint means connectable to the other conductor for said speech trunk and the other conductor of said substation loop, said crosspoints including a plurality of transistors having a combined characteristic permitting conduction for voltages above a predetermined voltage and for nonconduction for voltages below said predetermined voltage.

15. A distributed line concentrator system including a central office; a plurality of speech trunks connected to said central office; a plurality of number group leads and a number group return lead connected to said central office; a plurality of substations greater in number than said trunks; and a plurality of remotely located physically distinct line concentrator units, said units including means for connecting each of said substations to selected number group leads in accordance with a code, means for connecting each of said substations to said number group return lead, switching means including first and second crosspoint means for coupling said substations to said trunks, means operative under control of said central office for energizing said first crosspoint means, and means operative in response to the energization of said first crosspoint means to energize said second crosspoint means; said units being physically disposed in proximity to said substations.

16. A distributed telephone line concentrator system including a central office; a plurality of speech trunks connected to said central office; a plurality of number group leads and a number group return lead connected to said central office; a plurality of substations greater in number than said trunks; a plurality of line units individual to said substations, said units being physically separated and contiguous to said substations, said units including means for connecting each of said substations to selected number group leads in accordance with a code, means for connecting each of said substations to said number group return lead, first and second crosspoint means for coupling said substations to said trunks, means operative under control of said central office for energizing said first crosspoint means, and means operative in response to the energization of said first crosspoint means to energize said second crosspoint means; and means at said central office controlled by the energization of said crosspoints to indicate said energization.

17. A distributed telephone line concentrator system including a central office, a plurality of speech trunks and a plurality of signaling trunks extending from said office, a plurality of substations greater in number than said trunks and remotely located from said central office, concentrator means for connecting said substations to said speech trunks in accordance with signals over said signaling trunks, means for connecting said signaling trunks to each of said substations, and means at said central office operable on an all-trunks-busy condition for transmitting signals indicative of said all-busy condition to a calling substation over said signaling trunks.

18. A distributed telephone line concentrator system including a central office, a plurality of signaling trunks and speech trunks extending from said central office, a plurality of substations greater in number than said trunks remotely located from said office and from each other, concentrator means for connecting said substations to said speech trunks under control of signals received over said signaling trunks, means for connecting said signaling trunks to each of said substations, and means at said central office responsive to an all-trunks-busy condition on said speech trunks for providing a voice communication path over said signaling trunks to said central office.

19. A distributed telephone line concentrator system including a central office, a plurality of speech trunks and a plurality of signaling trunks extending from said office, a plurality of substations greater in number than said trunks and remotely located from said central office, concentrator means for connecting said substations to said speech trunks in accordance with signals over said signaling trunks, means for connecting said signaling trunks to each of said substations, and means at said central office for transmitting voice signals to said substations over said signaling trunks.

20. A distributed telephone line concentrator system in accordance with claim 19 including in addition means for transmitting voice communication signals from said substations to said central office over said signaling trunks.

21. A distributed telephone line concentrator system in accordance with claim 19 including in addition means for transmitting code signals from said substations to said central office.

22. A distributed telephone line concentrator system including a central office, a plurality of speech trunks, a plurality of number group leads and a number group return lead, said trunks and leads extending from said central office, a plurality of substations greater in number than said trunks and remotely located from said central office, concentrator means for connecting said substations to said speech trunks in accordance with signals over said number group leads, means in said concentrator means for coupling said substations to selected ones of said number group leads and for connecting all of said substations to said number group return lead, and means at said central office operable on an all-trunk-busy condition of said speech trunks for transmitting signals indicative of said condition over said number group return lead to a calling substation.

23. A distributed telephone line concentrator system in accordance with claim 22 including in addition means at said central office responsive to an all-trunks-busy condition on said speech trunks for providing a voice communication path to a calling substation including said number group return lead and said number group leads to a calling substation.

24. A distributed telephone line concentrator system including a central office, a plurality of speech trunks, number group conductors and a number group return conductor, said trunks and conductors extending from said central office, a plurality of substations greater in number than said trunks and remotely located from said office and from each other, a plurality of remote concentrator switching units individual to said substations and disposed along the length of said trunks and conductors, each of said units being physically disposed in closer proximity to its individual substation than to any other substation, said units including means for coupling said substations to selected ones of said number group conductors and for coupling all of said substations to said number group return conductor, and means at said central office for establishing voice communication paths among said substations over said number group return conductor and said number group conductors.

25. A distributed telephone line concentrator system including a central office, a plurality of speech trunks extending from said office, a plurality of number group conductors extending from said office and a number group return conductor extending from said office, a plurality of substations remotely located from said office and from each other, a plurality of remote concentrator switching units individual to said substations and disposed along the length of said trunks and conductors, each of said units being physically disposed in closer proximity to its individual substation than to any other substation, said units including means for coupling said substations to selected ones of said number group conductors and for coupling all of said substations to said number group return conductor, said units including means for coupling said substations to selected ones of said trunks in response to control signals from said central office, and means at said central office for providing a voice communication path over said number group conductors and number group return conductor to establish voice transmission from said central office to a plurality of substations simultaneously.

26. A distributed telephone line concentrator system in accordance with claim 25 including in addition means at said central office for transmitting code signals to said plurality of substations over said number group return conductor and said number group conductors simultaneously.

27. A telephone line concentrator system comprising a central office, a plurality of speech trunks extending from said central office, a plurality of number group conductors and a number group return conductor extending from said office, a plurality of subscriber stations, there being more said subscriber stations than said speech trunks and of said subscriber stations including a tip and a ring conductor, switching means for connecting said tip anl ring conductors to said speech trunks, diode means individual to each of said subscriber stations and connected to certain of said number group conductors in accordance with a code for each of said subscriber stations for operating said switching means, and means connecting one of said station tip and ring conductors to said diode means and the other of said tip and ring conductors to said number group return conductor for establishing an additional communication path including one of said said number group conductors and said number group return conductor.

28. A distributed telephone line concentrator system including a central office, a plurality of number group leads and a plurality of speech trunks extending in parallel from said office, a plurality of substations greater in number than said trunks remotely located from said central office and from each other, a plurality of remote concentrator devices individual to said substations and disposed along the length of said speech trunks and number group leads in accordance with the relative physical location of said substations, means for coupling said substations to said devices, said devices including rectifier means for joining said number group leads to said substations in accordance with a code, said devices including additional conductive means connected to said number group leads, and switching means in said devices for connecting said substations to said speech trunks in accordance with control signals from said central office over said number group leads and additional conductive means.

29. A distributed telephone line concentrator system in accordance with claim 28 including in addition control means at said central office responsive to an originating call at one of said substations for applying marking potentials to said number group leads to which said substation is connected and to a selected idle one of said speech trunks, said switching means being operative in response to the operation of said control means over a path including said additional conductive means.

30. A distributed telephone line concentrator system including a central office, a plurality of speech trunks connected to said central office, a plurality of number group leads connected to said central office, a plurality of substations greater in number than said trunks, and a plurality of remotely located physically distinct line concentrator units disposed along the length of said trunks in accordance with the relative physical location of said substations, said units including unilateral conducting means for connecting each of said substations to selected number group leads in accordance with a code, resistive means for connecting each of said substations to selected number group leads, switching means including first and second crosspoint means for coupling said substations to said trunks, means operative under control of said central office for energizing said first crosspoint means over a path including said resistive means, and means operative in response to the energization of said first crosspoint means to energize said second crosspoint means.

31. A distributed telephone line concentrator system including a central office, a plurality of speech trunks connected to said central office, a plurality of number group leads and a number group return lead connected to said central office, a plurality of substations greater in number than said trunks, and a plurality of remotely located physically distinct line concentrator units disposed in proximity to said substations, said units including unilateral conducting means for connecting each of said substations to selected number group leads in accordance with a code, linear conducting means for joining each of said substations to said number group leads, means for connecting each of said substations to said number group return lead, switching means including first and second crosspoint means for coupling said substations to said trunks, means operative under control of said central office for energizing said first crosspoint means over a path including said linear conducting means and said trunks, and means operative in response to the energization of said first crosspoint means to energize said second crosspoint means.

32. A distributed telephone line concentrator system including a telephone central office, a first and second plurality of trunks extending from said office, a plurality of substations greater in number than said trunks and remotely located from said central office and from each other, a plurality of remote concentrator units individual to said substations, said units being physically distributed along the length of said trunk in accordance with the physical location of said substations, said units including first means connecting said substations to selected ones of said first plurality of trunks, said units including second means connecting said substations to one of said selected ones of said first plurality of trunks, said units including additional means for connecting said substations to said second plurality of trunks in accordance with control signals from said central office, and control means at said central office responsive to a signaling condition at one of said substations over said first plurality of trunks for energizing said first plurality of trunks and a selected one of said second plurality of trunks to actuate said additional means at said remote unit over a path including said second means to establish a connection between said one substation and said selected trunk.

33. A distributed telephone line concentrator system in accordance with claim 32 wherein said first means includes unilaterally conducting means.

34. A distributed telephone line concentrator system in accordance with claim 33 wherein said second means includes resistive means.

35. A distributed telephone line concentrator system in accordance with claim 34 wherein said additional means includes first and second crosspoint means, said first crosspoint means being actuated over said path including said second means, and additional means in said units responsive to the energization of said first crosspoint means to energize said second crosspoint means.

References Cited in the file of this patent

UNITED STATES PATENTS

| | | |
|---|---|---|
| 2,402,446 | Powell | June 18, 1946 |
| 2,532,097 | Hersey | Nov. 28, 1950 |
| 2,820,103 | Abbott | Jan. 14, 1958 |

FOREIGN PATENTS

| | | |
|---|---|---|
| 449,436 | Great Britain | June 26, 1936 |